(12) United States Patent
Yoneya et al.

(10) Patent No.: US 8,829,791 B2
(45) Date of Patent: Sep. 9, 2014

(54) DISPLAY AND ELECTRONIC UNIT

(75) Inventors: Nobuhide Yoneya, Kanagawa (JP);
Hirofumi Nakamura, Kanagawa (JP);
Toru Tanikawa, Kanagawa (JP);
Satoshi Kumon, Tokyo (JP)

(73) Assignee: Sony Corporation, Tokyo (JP)

( * ) Notice: Subject to any disclaimer, the term of this patent is extended or adjusted under 35 U.S.C. 154(b) by 50 days.

(21) Appl. No.: 13/588,480

(22) Filed: Aug. 17, 2012

(65) Prior Publication Data
US 2013/0050632 A1 Feb. 28, 2013

(30) Foreign Application Priority Data
Aug. 23, 2011 (JP) .................................. 2011-181360

(51) Int. Cl.
*G02F 1/1339* (2006.01)
*G02F 1/1333* (2006.01)
*H01J 1/62* (2006.01)

(52) U.S. Cl.
CPC ........ *G02F 1/1333* (2013.01); *G02F 2201/501* (2013.01); *G02F 2001/133311* (2013.01); *G02F 1/133305* (2013.01); *G02F 2202/28* (2013.01)
USPC ............. 313/512; 349/58; 349/122; 349/153; 349/155; 349/158; 313/511

(58) Field of Classification Search
CPC ............. H01L 51/5237; H01L 5/5246; G02F 1/133305; G02F 1/1339
USPC .................................... 349/58, 122, 153, 158
See application file for complete search history.

(56) References Cited

U.S. PATENT DOCUMENTS

| | | | |
|---|---|---|---|
| 8,497,516 B2 * | 7/2013 | Yamazaki et al. | 257/81 |
| 2005/0116637 A1 | 6/2005 | Yoshizawa | |
| 2005/0285520 A1 | 12/2005 | Cok | |
| 2010/0244005 A1 * | 9/2010 | Gyoda | 257/40 |
| 2010/0264817 A1 * | 10/2010 | Bouten et al. | 313/512 |
| 2011/0100458 A1 | 5/2011 | Kang et al. | |
| 2011/0165918 A1 * | 7/2011 | Yamazaki et al. | 455/566 |

FOREIGN PATENT DOCUMENTS

| | | |
|---|---|---|
| JP | 2009-134324 | 6/2009 |
| JP | 2009-529711 A | 8/2009 |
| WO | WO-2007/078130 A1 | 7/2007 |

OTHER PUBLICATIONS

Extended European Search Report issued Feb. 21, 2013 for corresponding European Application No. 12 177 325.3.

* cited by examiner

*Primary Examiner* — Nathanael R Briggs
(74) *Attorney, Agent, or Firm* — Rader, Fishman & Grauer PLLC

(57) ABSTRACT

A display includes: a display substrate including a liquid crystal layer; a driving substrate driving the display substrate; and a damp-proof layer continuously provided along a top face and side faces of the display substrate, and a top face of the driving substrate.

20 Claims, 5 Drawing Sheets

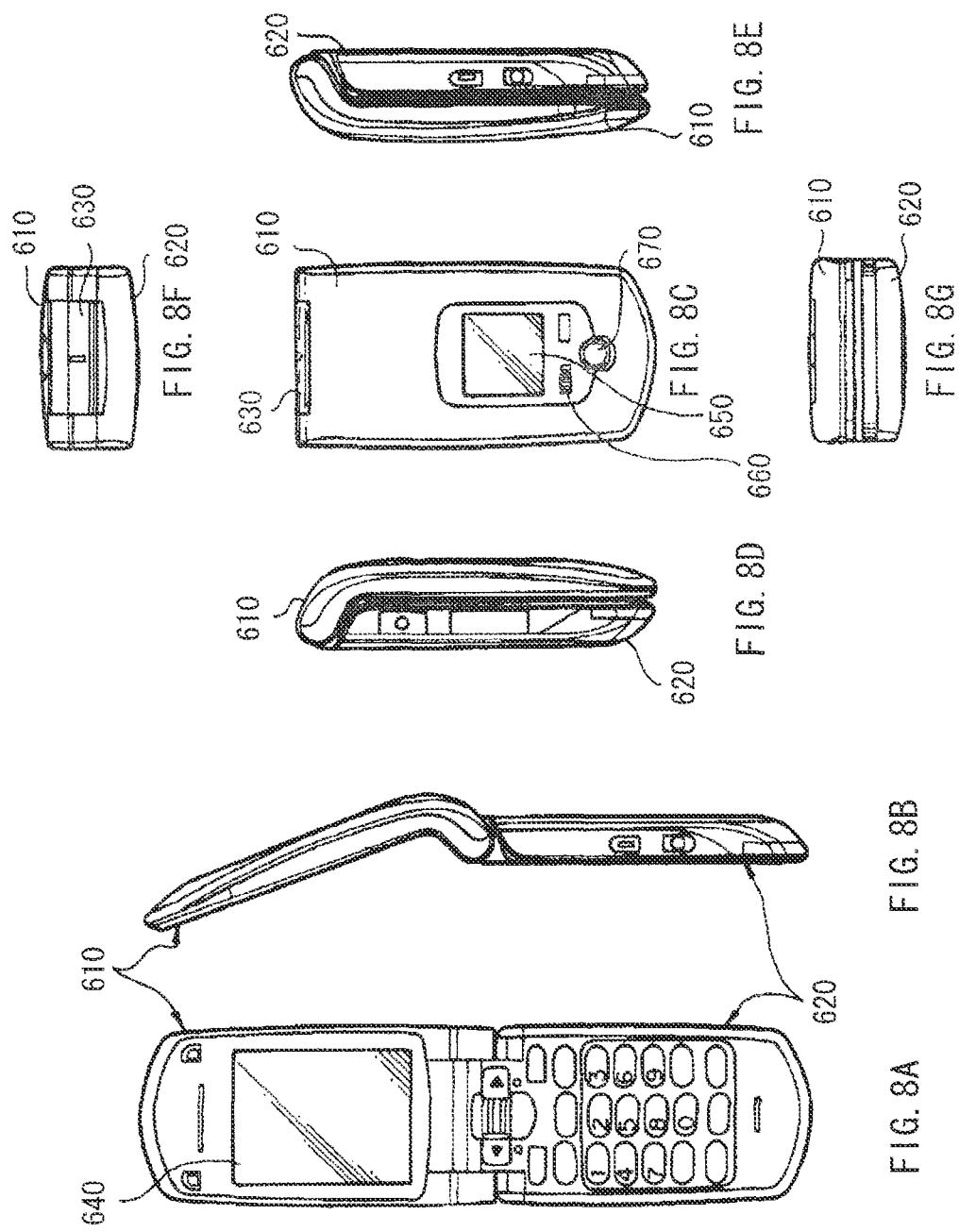

DISPLAY AND ELECTRONIC UNIT

BACKGROUND

The present technology relates to a display including a liquid crystal layer, and an electronic unit including the display.

In recent years, as various electronic units such as mobile phones and personal digital assistants (PDAs) come into wide use, demand for a display that offers lower power consumption and high image quality is increasing. Above all, nowadays, since electronic book terminals for reading letter information for long periods of time are attracting attention along with the advent of distribution businesses of electronic books, a display having visual quality suitable for such a purpose is desired.

As displays for reading, displays of cholesteric liquid crystal type, electrophoresis type, electric oxidation reduction type, and twist ball type are proposed. Above all, liquid crystal displays that generate contrast by utilizing variation in orientation of liquid crystal molecules are preferable. In particular, in consideration of handleability or the like, liquid crystal displays of flexible type using a flexible plastic film or the like as a supporting base are more preferable.

In addition, displays classified as reflection type are also preferable. The reason for this is that since such displays utilize reflection (scattering) of external light similarly to a paper in order to perform bright display, display quality close to that of the paper is obtained, and that since a backlight is unnecessary, power consumption is reduced.

A leading candidate of the displays of the reflection type is electrophoretic displays that utilize the electrophoresis of electric charge particles to generate contrast. This is because electrophoretic displays offer low power consumption and very quick response. The electrophoretic display is provided with a display substrate including an electrophoretic element, and a driving substrate including a thin film transistor (TFT) that drives the display substrate and the like.

Along with practical use of electrophoretic displays, various studies have been made with respect to ensuring of performance. Specifically, it is known that a display substrate is covered with a protective layer in order to prevent a situation in which the movement of electric charge particles is interfered by intrusion of water. In this case, it is proposed that a protective layer is provided on a top face of a display substrate, and a sealing material is formed on side faces of the display substrate (see, for example, Japanese Unexamined Patent Application Publication No. 2009-134324). It is also proposed that a display substrate is covered by a protective layer, and end portions of the protective layer are adhered to a surface of a driving substrate through an adhesive agent (see, for example, Published Japanese Translation of PCT Application No. JP 2009-529711).

SUMMARY

While electrophoretic displays are developed, there is a necessity to prevent intrusion of water in order to ensure the performance of liquid crystal displays similarly to the case of electrophoretic displays. However, existing countermeasures with respect to liquid crystal displays are not yet sufficient, and there is room for improvement.

It is desirable to provide a display and an electronic unit which ensure display performance.

According to an embodiment of the disclosure, there is provided a display including: a display substrate including a liquid crystal layer; a driving substrate driving the display substrate; and a damp-proof layer continuously provided along a top face and side faces of the display substrate, and a top face of the driving substrate.

According to an embodiment of the disclosure, there is provided an electronic unit including a display, the display including: a display substrate including a liquid crystal layer; a driving substrate driving the display substrate; and a damp-proof layer continuously provided along a top face and side faces of the display substrate, and a top face of the driving substrate.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 8A to 8G are plan views each showing a configuration of a mobile phone provided with the display.

DETAILED DESCRIPTION

Referring to the figures, an embodiment of the present technology will be described in detail. Description will be given in the following order.
1. Display
1-1. Configuration
1-2. Manufacturing Method
1-3. Modification
2. Application Example of Display (Electronic Unit)
(1. Display/1-1. Configuration)

Figure 1:
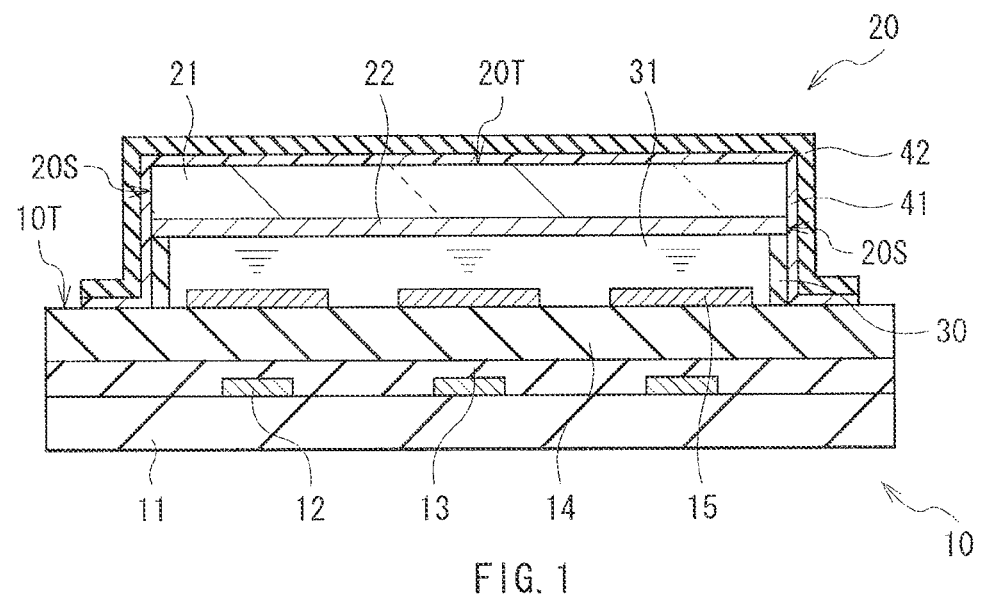
FIG. 1 is a sectional view showing a configuration of a display according to an embodiment of the present technology.

First, a configuration of a display according to an embodiment of the present technology is described. FIG. 1 shows a cross-sectional configuration of the display. This display is applicable to various kinds of electronic units, and the kind of electronic unit is not particularly limited.

The display described here is a liquid crystal display device (so-called liquid crystal display) which utilizes variation in orientation of liquid crystal molecules to display an image. In this display, for example, a driving substrate 10 and a display substrate 20 are disposed to face each other with a spacer 30 and a liquid crystal layer 31 therebetween as illustrated in FIG. 1, and an image is displayed on the display substrate 20 side. The driving substrate 10 and the display substrate 20 are provided with a damp-proof layer 42.

[Driving Substrate]

The driving substrate 10 includes a thin film transistor (TFT) 12, a protective layer 13, a planarizing insulating layer 14, a pixel electrode 15 which are formed on the entire surface of a supporting base 11 in this order, for example. The TFT 12 and the pixel electrode 15 are disposed in matrix or a segmented form corresponding to a pixel placement, for example.

The supporting base 11 is, for example, made of one or more kinds of inorganic materials, metal materials, plastic materials, and the like. Examples of the inorganic materials include silicon (Si), silicon oxide ($SiO_x$), silicon nitride ($SiN_x$), aluminum oxide ($AlO_x$), and the like, and the silicon oxide includes glass, spin on glass (SOG), and the like, for example. Examples of the metal materials include aluminum (Al), nickel (Ni), stainless, and the like. Examples of the plastic materials include polycarbonate (PC), polyethylene terephthalate (PET), polyethylene naphthalate (PEN), polyether ether ketone (PEEK), and the like.

The supporting base 11 may be of light transmission type or non-light transmission type. Since an image is displayed on the display substrate 20 side, the supporting base 11 is not necessarily of the light transmission type. In addition, while the supporting base 11 may be configured of either a substrate having rigidity such as a wafer, or a thin layer glass or a film having flexibility, the supporting base 11 preferably has flexibility. This is because, in this case, a flexible (bendable) liquid crystal display is realized.

The TFT 12 is a switching device configured to select pixels. The TFT 12 may be configured of an inorganic TFT employing as a channel layer an inorganic semiconductor layer of amorphous silicon, poly silicon, or oxide, or an organic TFT employing as a channel layer an organic semiconductor layer of pentacene or the like, for example. The protective layer 13 and the planarizing insulating layer 14 each contains, for example, an insulating material such as polyimide. It is to be noted that, in the case where the surface of the protective layer 13 is sufficiently flat, the planarizing insulating layer 14 is not necessary.

The pixel electrode 15 includes one or more kinds of conductive materials such as gold (Au), silver (Ag), and copper (Cu), for example. The pixel electrode 15 is connected to the TFT 12 through a contact hole (not shown) provided in the protective layer 13 and the planarizing insulating layer 14. It should be noted that, the number of the TFT 12 disposed for each pixel electrode 15 is not particularly limited, and the number may be one or two or more.

[Display Substrate]

The display substrate 20 is a substrate in which an opposite electrode 22 is formed on the entire surface of a supporting substrate 21, for example.

The supporting substrate 21 is made of a material similar to that of the supporting base 11 except that the supporting substrate 21 is of a light transmission type. Since an image is displayed on the display substrate 20 side, it is necessary for the supporting substrate 21 to have light permeability. In particular, similarly to the above-mentioned supporting base 11, in order to realize a flexible type liquid crystal display, the supporting substrate 21 preferably has flexibility.

The opposite electrode 22 includes, for example, one or more kinds of light-transmissive conductive materials (transparent electrode materials). Examples of the light-transmissive conductive materials include indium tin oxide (ITO), antimony tin oxide (ATO), fluorine doped tin oxide (FTO), aluminum doped zinc oxide (AZO), and the like. The opposite electrode 22 is formed on the entire surface of the supporting substrate 21, for example. It is to be noted that, the opposite electrode 22 is disposed in matrix or a segmented form, similarly to the pixel electrode 15.

In order to display an image on the display substrate 20 side, it is preferable to set the light transmittance of the opposite electrode 22 as high as possible, and for example, the light transmittance is set to 80% or more. In addition, it is preferable to set the electric resistance of the opposite electrode 22 as low as possible, and for example, the electric resistance is set to $100\Omega/\square$ or lower.

[Spacer and Liquid Crystal Layer]

The spacer 30 is configured to keep the distance between the driving substrate 10 and the display substrate 20 constant, and the material and form thereof is not particularly limited. The liquid crystal layer 31 contains a plurality of liquid crystal molecules, and utilizes variations in orientation of the liquid crystal molecules to generate contrast. The orientational state of the liquid crystal molecules is variable in response to electric field, and the kind of the liquid crystal molecules (liquid crystal material) is not particularly limited.

[Damp-Proof Layer]

The damp-proof layer 42 is continuously provided along a top face 20T and side faces 20S of the display substrate 20 and a top face 10T of the driving substrate 10. More specifically, for example, the damp-proof layer 42 is adhered to the display substrate 20 and the driving substrate 10 through an adhesive layer 41 continuously provided along, in this order, the top face 10T, the side face 20S, the top face 20T, the side face 20S, and the top face 10T. With this configuration, the driving substrate 10 and the display substrate 20 is covered with the damp-proof layer 42 which is a single continuous layer, and the damp-proof layer 42 is tightly adhered to the driving substrate 10 and the display substrate 20. Therefore, there is substantially no gap between the damp-proof layer 42 and the driving substrate 10, and between the damp-proof layer 42 and the display substrate 20.

The adhesive layer 41 includes, for example, one or more kinds of pressure-sensitive adhesive agents and heat-sensitive adhesive agents. The damp-proof layer 42 is a so-called water vapor barrier film, and includes one or more kinds of inorganic materials, polymer materials, and the like, for example. Examples of the inorganic materials include silicon nitride (SiN), silicon oxide ($SiO_x$), and aluminum oxide ($Al_2O_x$). Examples of the polymer materials include polyethylene terephthalate, polymethylmethacrylate, polycarbonate, polyethylene naphthalate, polypropylene, nylon-6, nylon-66, poly vinylidene chloride, polyether sulfone, and the like. It should be noted that, the damp-proof property (moisture permeability or water transmittance) of the damp-proof layer 42 is preferably, for example, 0.1 $g/m^2$ per day to 0.000001 $g/m^2$ per day, more preferably, 0.03 $g/m^2$ per day or lower. The reason for this is that since intrusion of water is sufficiently prevented, the display performance of the display is less likely to be lowered. In addition, it is preferable to set the light transmittance of the damp-proof layer 42 as high as possible.

Further, the liquid crystal display may include other configuration elements such as a retardation plate, a polarization plate, an alighnment film, a backlight unit, and the like (which are not shown), for example.

[Operation of Display]

In the display, when a pixel is selected by the TFT 12, and electric field is applied across the pixel electrode 15 and the opposite electrode 22 corresponding to the pixel, the orientational state of liquid crystal molecules in the liquid crystal layer 31 is varied in response to the intensity of the electric field. Consequently, the transmission amount (transmittance) of light is controlled according to the orientational state of the liquid crystal molecules, and thus an image is displayed.

(1-2. Manufacturing Method)

For example, the display is manufactured by the following procedure.

First, the TFT 12, the protective layer 13, the planarizing insulating layer 14, and the pixel electrode 15 are formed in this order on the entire surface of the supporting base 11 to prepare the driving substrate 10. In addition, the opposite electrode 22 is formed on the entire surface of the supporting substrate 21 to form the display substrate 20. It should be noted that, the method of forming the composing elements may be appropriately selected from among existing film formation methods, patterning methods, and the like, for example.

Next, after the driving substrate 10 and the display substrate 20 are set so as to face each other with the spacer 30 therebetween, liquid crystal is injected into a space surrounded by the substrates and the spacer 30 to form the liquid crystal layer 31.

Finally, after an adhesive agent is applied to the top face 10T of the driving substrate 10 and the top face 20T and the side faces 20S of the display substrate 20 to form the adhesive layer 41, the damp-proof layer 42 is adhered to the driving substrate 10 and the display substrate 20 with the adhesive layer 41 in between. In this way, the display is completed.

It is also possible to use, at the time of adhering the damp-proof layer 42, the damp-proof layer 42 formed with the adhesive layer 41, or the damp-proof layer 42 prepared separately from the adhesive layer 41.

[Function and Effect of Display]

In the display, the damp-proof layer 42 is continuously provided along the top face 10T of the driving substrate 10 and the top face 20T and the side faces 20S of the display substrate 20. In this instance, since the damp-proof layer 42 is a single continuous layer, and different from a known case where the damp-proof layer 42 is composed of separately formed two components (for example, the known protective layer and sealing material), the damp-proof layer 42 of the present embodiment has no joint line. This suppresses intrusion of water into the inside from the outside of the display substrate 20 by way of the joint line. Besides, there is substantially no gap between the damp-proof layer 42 and the side faces 20S. This suppresses mixing-in of water in the gap during the manufacturing of the display different from the known case in which the gap exists. Consequently, since the damp-proof layer 42 effectively suppresses intrusion of water into the display substrate 20, degradation of the orientation of liquid crystal molecules is suppressed in the liquid crystal layer 31, and long term stability of the liquid crystal layer 31 and the like is improved. As a result, display performance is ensured.

In particular, since the damp-proof layer 42 is formed as a single continuous layer, the damp-proof layer 42 may be formed by one process, and therefore, in comparison to the case where two processes are necessitated to form the damp-proof layer 42 composed of two components, the damp-proof layer 42 is allowed to be readily formed.

In addition, if the damp-proof layer 42 is adhered to the driving substrate 10 and the display substrate 20 with the adhesive layer 41 in between, the adhesive layer 41 provided along the top face 20T, the side faces 20S, and the top face 10T, a gap is unlikely to be formed between the damp-proof layer 42 and the side faces 20S. Besides, different from a known case where the adhesive layer 41 is not provided on the side faces 20S, intrusion of water is prevented at the side faces 20S not only by the damp-proof layer 42 but also by the adhesive layer 41. Consequently, the higher effects are obtainable.

(1-3. Modification)

Figure 2:
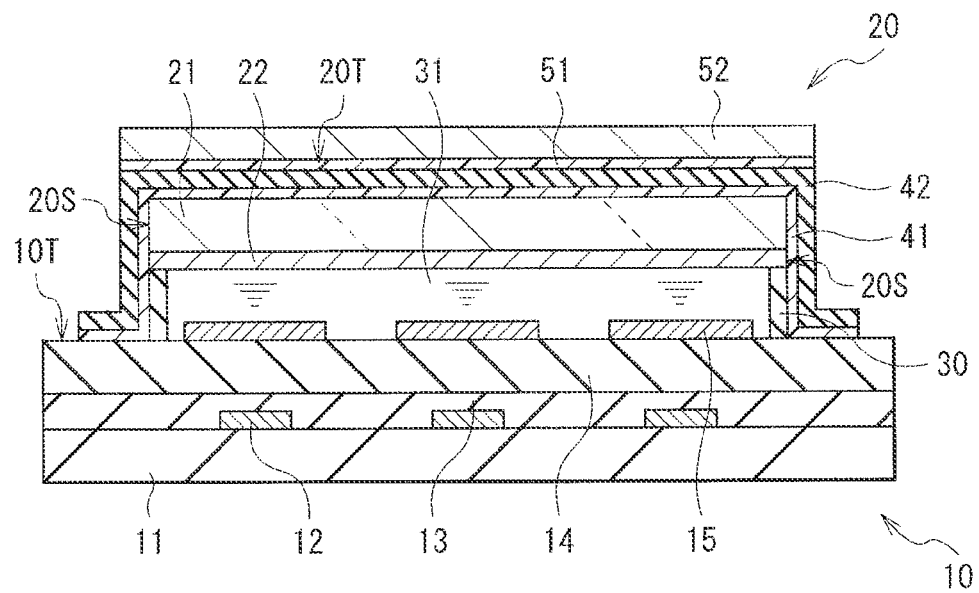
FIG. 2 is a sectional view showing a modification with respect to the configuration of the display.

As illustrated in FIG. 2, it is also possible to adhere a function layer 52 for various purposes on the damp-proof layer 42 provided on the upper side of the display substrate 20 with an adhesive layer 51 in between, as necessary.

The function layer 52 is, for example, an anti reflection (AR) film, an anti glare (AG) film, or the like. It is to be noted that, the function layer 52 may also be a layer having other functions, and may also be a layer in which two or more kinds of layers having different functions are laminated. At the time of forming the function layer 52, for example, the function layer 52 may be adhered to the damp-proof layer 42 through the adhesive layer 51 with use of a laminating machine or the like. In this case, similarly to the case of adhering the damp-proof layer 42, it is also possible that the function layer 52 is previously adhered to the damp-proof layer 42 with the adhesive layer 51 in between, and the damp-proof layer 42, together with the function layer 52, is adhered to the driving substrate 10 and the display substrate 20. When the function layer 52 is adopted, various functions may be added to the display.

(2. Application Example of Display (Electronic Unit))

Next, application examples of the above-mentioned display are described. It is to be noted that, configurations of electronic units described below are merely examples, and may be appropriately changed.

Figure 3A:
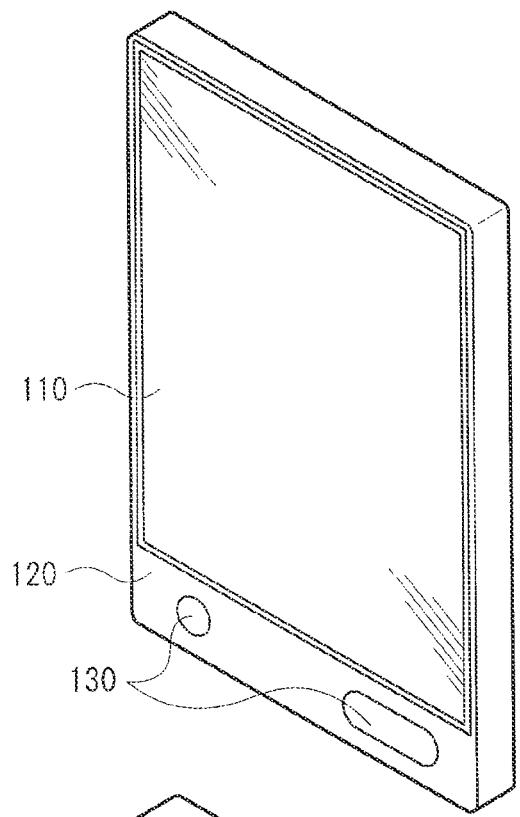
FIGS. 3A and 3B are perspective views each showing a configuration of an electronic book provided with the display.
Figure 3B:
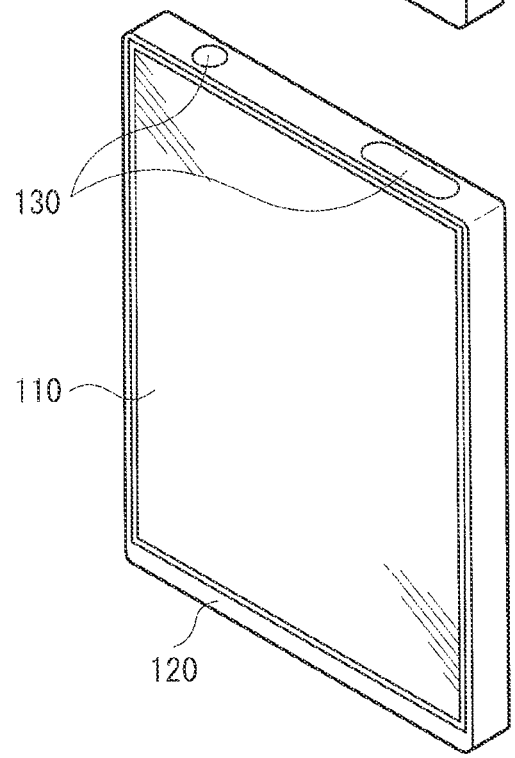

FIGS. 3A and 3B each show an external configuration of an electronic book. This electronic book includes, for example, a display section 110, a non-display section (housing) 120, and an operation section 130. It should be noted that, the operation section 130 may be provided on a front face of the non-display section 120 as illustrated in FIG. 3A, or on a top face of the non-display section 120 as illustrated in FIG. 3B. It should be noted that, the display may be incorporated in a PDA having a configuration similar to that of the electronic book illustrated in FIGS. 3A and 3B.

Figure 4:
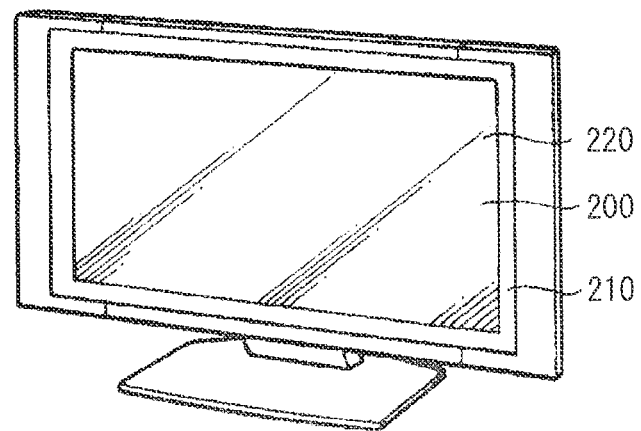
FIG. 4 is a perspective view showing a configuration of a television provided with the display.

FIG. 4 shows an external configuration of a television. This television is provided with, for example, an image display screen section 200 including a front panel 210 and a filter glass 220.

Figure 5A:
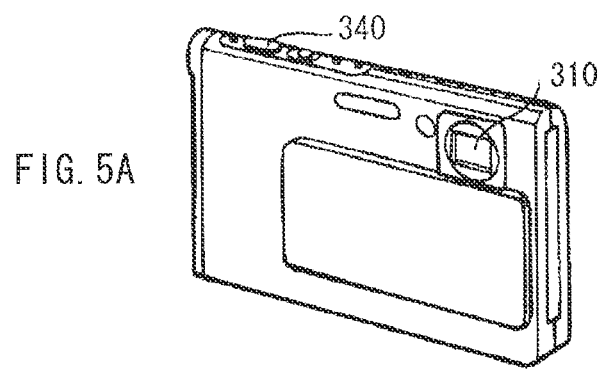
FIGS. 5A and 5B are perspective views each showing a configuration of a digital still camera provided with the display.
Figure 5B:
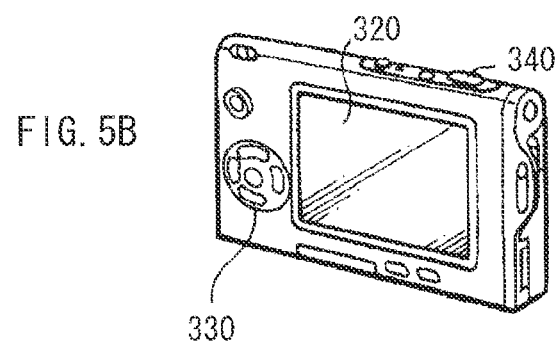

FIGS. 5A and 5B each show an external configuration of a digital still camera. FIGS. 5A and 5B illustrate a front face and a rear face thereof, respectively. This digital still camera includes, for example, a light emitting section 310 for generating flash light, a display section 320, a menu switch 330, and a shutter button 340.

Figure 6:
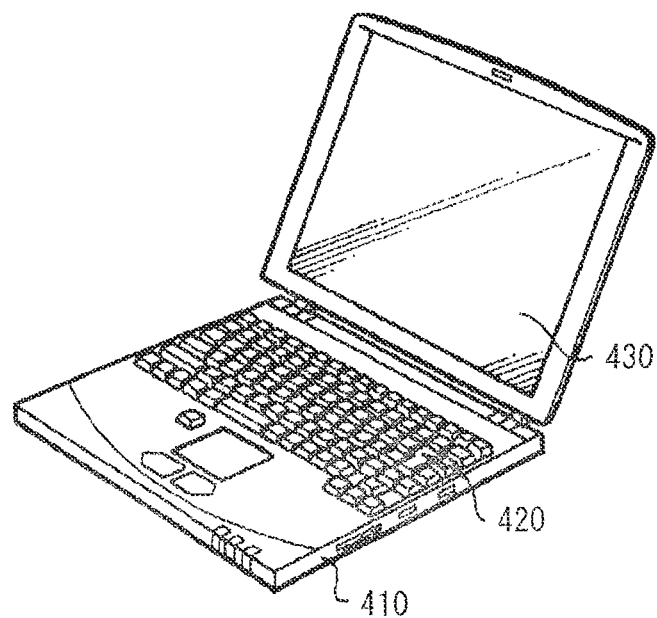
FIG. 6 is a perspective view showing an external appearance of a personal computer provided with the display.

FIG. 6 shows an external configuration of a notebook personal computer. This notebook personal computer includes, for example, a main body 410, a keyboard 420 for inputting letters and the like, and a display section 430 displaying an image.

Figure 7:
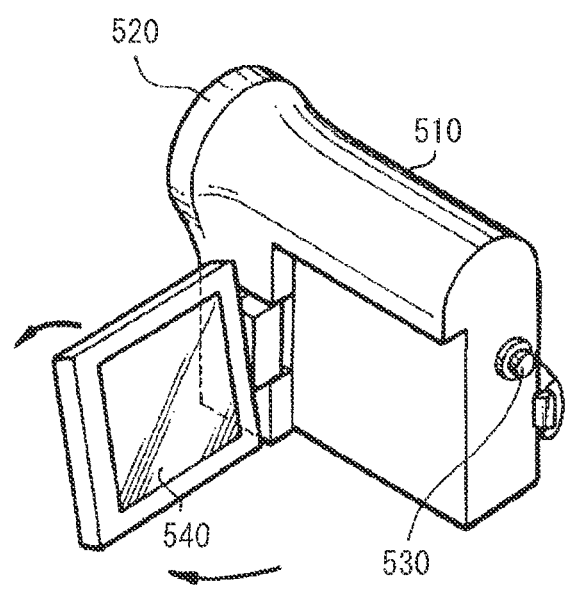
FIG. 7 is a perspective view showing an external appearance of a video camera provided with the display.

FIG. 7 shows an external configuration of a video camera. This video camera includes, for example, a main body section 510, a lens 520 which is adapted to take an image of a subject and provided on the front side of the main body section 510, a start/stop switch 530 for capturing an image, and a display section 540.

FIGS. 8A to 8G each show an external configuration of a mobile phone. FIGS. 8A and 8B illustrate a front face and a side face of the mobile phone in an unfolded state, respectively. FIGS. 8C to 8G illustrate a front face, a left side face, a right side face, a top face, and a bottom face of the mobile phone in a folded state, respectively. This mobile phone includes, for example, an upper side housing 610, a lower side housing 620, a connecting section (hinge section) 630 connecting the upper side housing 610 and the lower side housing 620, a display 640, a sub-display 650, a picture light 660, and a camera 670.

Hereinabove, while the present technology has been described based on the embodiment, the present technology is not limited to the modes described in the embodiment, and various modifications may be made. For example, the display according to the embodiment of the present technology is applicable to other electronic units in addition to the above-mentioned electronic units. "Other electronic units" include, for example, an electrophoretic display and the like.

It is possible to achieve at least the following configurations from the above-described example embodiment and the modification of the disclosure.

(1) A display including:
 a display substrate including a liquid crystal layer;
 a driving substrate driving the display substrate; and
 a damp-proof layer continuously provided along a top face and side faces of the display substrate, and a top face of the driving substrate.

(2) The display according to (1), wherein the damp-proof layer is adhered to the display substrate and the driving substrate with an adhesive layer in between, the adhesive layer being provided along the top face and the side faces of the display substrate and the top face of the driving substrate.

(3) The display according to (1) or (2), wherein each of the display substrate and the driving substrate includes a flexible supporting base.

(4) An electronic unit including a display, the display including:
 a display substrate including a liquid crystal layer;
 a driving substrate driving the display substrate; and
 a damp-proof layer continuously provided along a top face and side faces of the display substrate, and a top face of the driving substrate.

The present disclosure contains subject matter related to that disclosed in Japanese Priority Patent Application JP 2011-181360 filed in the Japan Patent Office on Aug. 23, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display comprising:
 a spacer between a planarizing insulating layer and an opposite electrode, said opposite electrode and said planarizing insulating layer touching said spacer;
 a supporting substrate between said opposite electrode and an adhesive layer, said adhesive layer touching said spacer and said supporting substrate;
 a damp-proof layer adhered to said supporting substrate and said planarizing insulating layer, said adhesive layer adhering said supporting substrate and said planarizing insulating layer to said damp-proof layer.

2. The display according to claim 1, wherein said spacer is a material.

3. The display according to claim 1, wherein said adhesive layer extends from said supporting substrate to said planarizing insulating layer.

4. The display according to claim 1, wherein said adhesive layer touches said opposite electrode and said planarizing insulating layer.

5. The display according to claim 1, wherein said damp-proof layer is from the group consisting of an inorganic material and a polymer material.

6. The display according to claim 1, wherein said planarizing insulating layer is between said opposite electrode and a flexible supporting base.

7. The display according to claim 1, wherein a driving substrate portion of the adhesive layer is between said planarizing insulating layer and a driving substrate portion of the damp-proof layer.

8. The display according to claim 7, wherein said driving substrate portion of the adhesive layer touches said planarizing insulating layer and said driving substrate portion of the damp-proof layer.

9. The display according to claim 1, wherein a top face portion of the adhesive layer is between said supporting substrate and a top face portion of the damp-proof layer.

10. The display according to claim 9, further comprising:
 a function layer adhered to said damp-proof layer, said top face portion of the damp-proof layer being between said supporting substrate and said function layer.

11. The display according to claim 9, wherein said top face portion of the adhesive layer touches said supporting substrate and said top face portion of the damp-proof layer.

12. The display according to claim 1, wherein a side face portion of the adhesive layer is between said spacer and a side face portion of the damp-proof layer.

13. The display according to claim 12, wherein said side face portion of the adhesive layer touches said spacer and said side face portion of the damp-proof layer.

14. The display according to claim 12, further comprising:
 a pixel electrode between said planarizing insulating layer and said opposite electrode, said spacer being between said pixel electrode and said side face portion of the adhesive layer.

15. The display according to claim 14, further comprising:
 a thin film transistor, said pixel electrode between being between said opposite electrode and said thin film transistor.

16. The display according to claim 1, further comprising:
 an electro-optical layer between said planarizing insulating layer and said opposite electrode, said opposite electrode being between said supporting substrate and said electro-optical layer.

17. The display according to claim 16, wherein said electro-optical layer is a liquid crystal layer.

18. The display according to claim 16, wherein said electro-optical layer touches said opposite electrode and said planarizing insulating layer.

19. The display according to claim 16, wherein said electro-optical layer touches said spacer.

20. An electronic unit including the display according to claim 1.

* * * * *